(12) United States Patent
Nakamura

(10) Patent No.: US 11,420,482 B2
(45) Date of Patent: Aug. 23, 2022

(54) PNEUMATIC TIRE

(71) Applicant: Toyo Tire Corporation, Itami (JP)

(72) Inventor: Masashi Nakamura, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 142 days.

(21) Appl. No.: 17/007,040

(22) Filed: Aug. 31, 2020

(65) Prior Publication Data

US 2021/0094360 A1    Apr. 1, 2021

(30) Foreign Application Priority Data

Sep. 30, 2019  (JP) .............................. JP2019-180663
Sep. 30, 2019  (JP) .............................. JP2019-180674
Sep. 30, 2019  (JP) .............................. JP2019-180677

(51) Int. Cl.
  *B60C 11/01*   (2006.01)
  *B60C 13/02*   (2006.01)
  *B60C 11/03*   (2006.01)

(52) U.S. Cl.
  CPC .............. *B60C 13/02* (2013.01); *B60C 11/01* (2013.01); *B60C 2011/013* (2013.01); *B60C 2011/0341* (2013.01)

(58) Field of Classification Search
  CPC ... B60C 11/01; B60C 2011/013; B60C 13/00; B60C 13/02
  See application file for complete search history.

(56) References Cited

U.S. PATENT DOCUMENTS

| 3,253,635 A * | 5/1966 | Travers ..................... B60C 9/20 |
| | | 152/523 |
| 2003/0116246 A1* | 6/2003 | Kuroda .................. B60C 11/033 |
| | | 152/209.8 |
| 2010/0314013 A1* | 12/2010 | Miyake ................... B60C 11/01 |
| | | 152/209.18 |

(Continued)

FOREIGN PATENT DOCUMENTS

| DE | 1480933 A1 * | 4/1969 |
| JP | 02048202 A  * | 2/1990 |
| JP | 05262105 A  * | 10/1993 |

(Continued)

OTHER PUBLICATIONS

Machine Translation: KR-792977-B1, Kim J. (Year: 2022).*

(Continued)

*Primary Examiner* — Kendra Ly
(74) *Attorney, Agent, or Firm* — WHDA, LLP

(57) ABSTRACT

A tire has at least two annular grooves which are formed at the buttress, which extend in a tire circumferential direction, which are ring-like in shape, and which also extend so as to be directed toward an interior in the tire width direction. The at least two annular grooves include a first annular groove which is nearest to the contact patch, and a second annular groove which is farther away from the contact patch than the first annular groove. The bottoms of the first annular groove and the second annular groove are formed so as to appear arcuate in shape as viewed in a tire meridional section. The radius of curvature of the bottom of the first annular groove is greater than radius of curvature of the bottom of the second annular groove.

10 Claims, 10 Drawing Sheets

(56) References Cited

U.S. PATENT DOCUMENTS

2019/0176523 A1    6/2019    Nakamura

FOREIGN PATENT DOCUMENTS

| | | | | |
|---|---|---|---|---|
| JP | 06191225 A | * | 7/1994 | |
| JP | 09136512 A | * | 5/1997 | |
| JP | 2011102073 A | * | 5/2011 | ............ B60C 11/01 |
| JP | 2013107426 A | * | 6/2013 | |
| JP | 2019-99077 A | | 6/2019 | |
| KR | 2006000240 A | * | 1/2006 | ............ B60C 11/03 |
| KR | 792977 B1 | * | 1/2008 | ............ B60C 11/01 |
| KR | 20120077166 A | * | 7/2012 | |

OTHER PUBLICATIONS

Machine Translation: KR-2006000240-A, Yoon S H, (Year: 2022).*
Machine Translation: JP-06191225-A, Taga G, (Year: 2022).*
Machine Translation: JP-02048202-A, Kondo T, (Year: 2022).*
Machine Translation: JP-2011102073-A.Shingo T, (Year: 2022).*
Machine Translation: JP-05262105-A.Numata K, (Year: 2022).*
Machine Translation: KR-20120077166-A, Lee Jung Geun, (Year: 2022).*
Machine Translation: JP-2013107426-A, Yoshikawa Y, (Year: 2022).*
Machine Translation: JP-09136512-A, Matsui H, (Year: 2022).*
Machine Translation: DE-1480933-A1, Klenk Hans, (Year: 2022).*

* cited by examiner

PNEUMATIC TIRE

BACKGROUND OF THE INVENTION

The present disclosure relates to a pneumatic tire.

It is known that pneumatic tires used in trucks and buses are such that, contact patch pressure being high at the shoulder edge which is the edge of the contact patch formed by the tread, there is a tendency for wear to occur at the shoulder edge.

Japanese Patent Application Publication Kokai No. 2019-99077 discloses a tire in which two annular grooves are formed at the buttress of the tire sidewall so as to lower contact patch pressure at the shoulder edge.

Strain is produced at the bottoms of the annular grooves formed at the buttress, and cracking can occur at the groove bottom if the strain is too large. Where at least two annular grooves are provided, because the annular groove that is nearest to the contact patch will have the greatest tendency to undergo deformation, strain tends to be concentrated and cracking tends to occur at the annular groove that is nearest to the contact patch.

SUMMARY OF THE INVENTION

The present disclosure provides a pneumatic tire in which there is reduced occurrence of annular groove cracking and/or other such problems.

According of the present disclosure, there is provided a pneumatic tire comprising:

a tread that forms a contact patch;

a buttress which is that portion of a tire sidewall located toward an exterior in a tire width direction from the tread that is a region from an edge of the tread to a tire maximum width location; and at least two annular grooves which are formed at the buttress, which extend in a tire circumferential direction, which are ring-like in shape, and which also extend so as to be directed toward an interior in the tire width direction;

wherein the at least two annular grooves include a first annular groove which is nearest to the contact patch, and a second annular groove which is farther away from the contact patch than the first annular groove;

bottoms of the first annular groove and the second annular groove are formed so as to appear arcuate in shape as viewed in a tire meridional section; and radius of curvature of the bottom of the first annular groove is greater than radius of curvature of the bottom of the second annular groove.

DETAILED DESCRIPTION OF THE PREFERRED EMBODIMENTS

Figure 1:
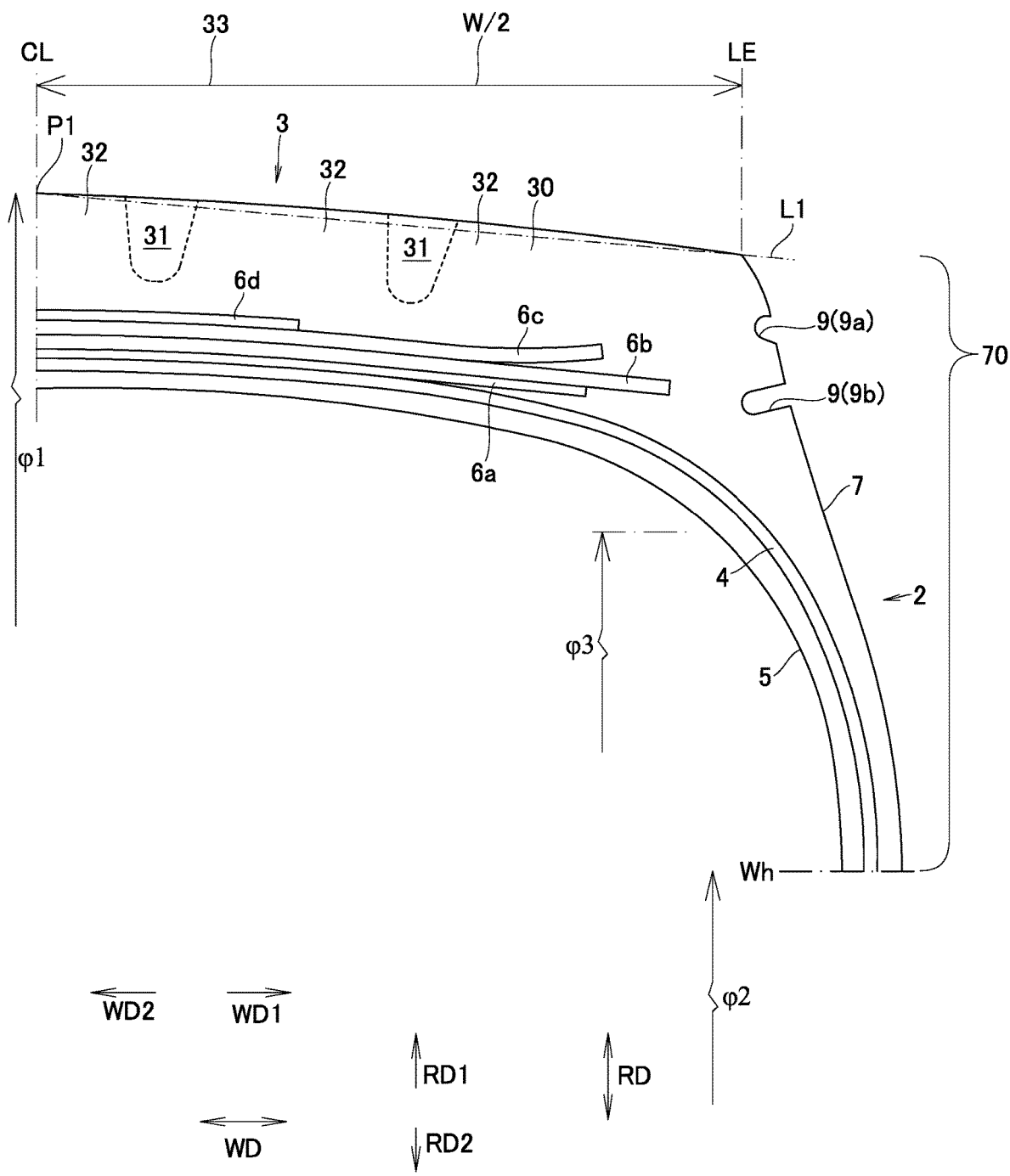
FIG. 1 Tire meridional section showing principal components in an example of a pneumatic tire in accordance with a first embodiment.

Below, a pneumatic tire in a first embodiment in accordance with the present disclosure is described with reference to the drawings. In the drawings, "CD" refers to the tire circumferential direction, "WD" refers to the tire width direction, and "RD" refers to the tire radial direction. The respective drawings show shapes as they would exist when the tire is still new.

Figure 2:
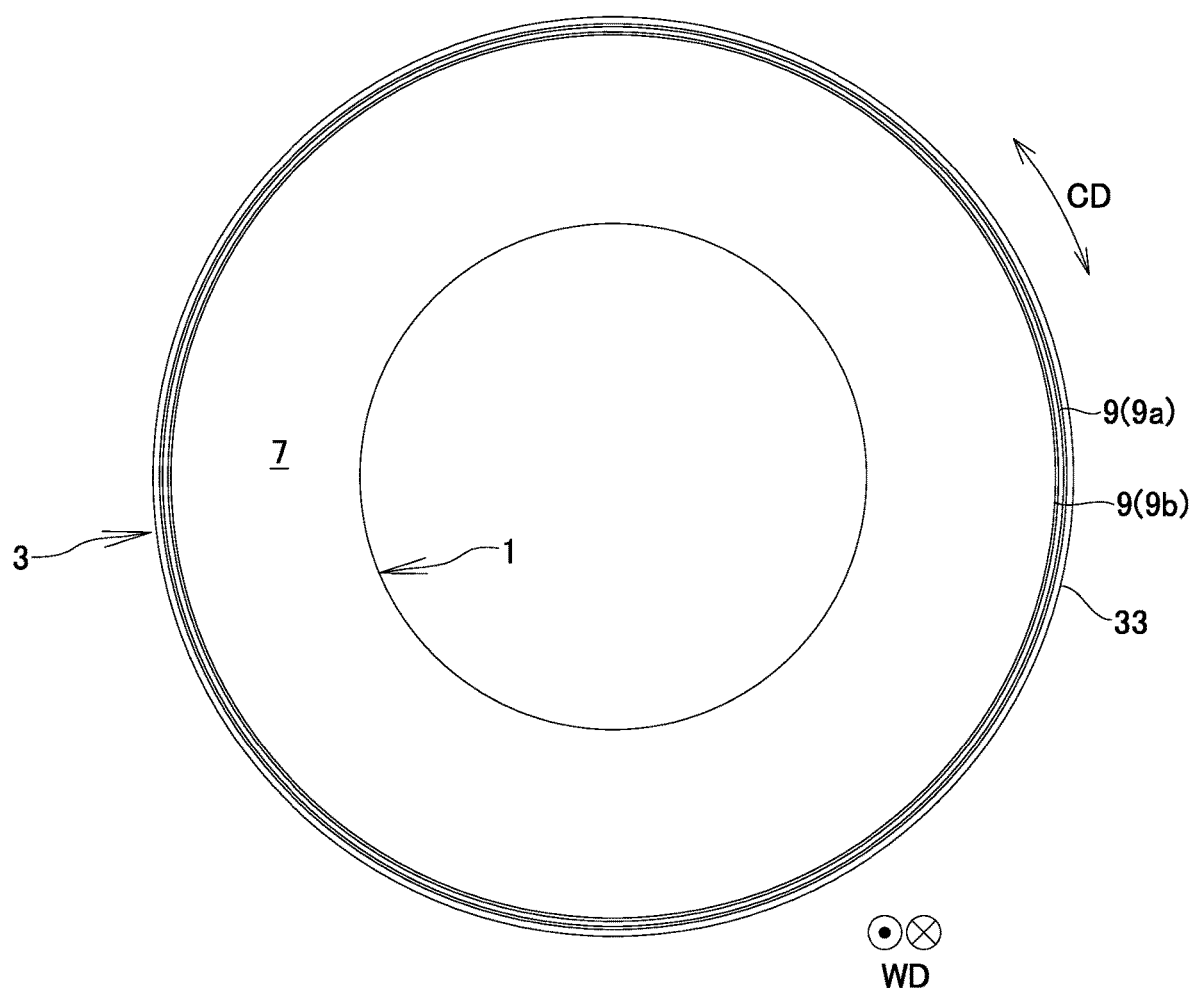
FIG. 2 Side view of the pneumatic tire in accordance with the first embodiment.

As shown in FIGS. 1 and 2, pneumatic tire is provided with a pair of bead 1; sidewall 2 which extend toward the exterior RD1 in the tire radial direction from the respective bead 1; and tread 3 which mutually connects the ends toward the exterior RD1 in the tire radial direction of the sidewall 2. Arranged at bead 1 are annular bead core (not shown) at which steel wire or other such convergent body is coated with rubber, and bead filler (not shown) which comprises hard rubber. Bead 1 is mounted on bead sheet of rim (not shown), and—provided that the air pressure is as it should be (e.g., air pressure as determined by JATMA)—is fitted in appropriate fashion to rim flange by virtue of the tire internal pressure, such that the tire is made to engage with rim.

Furthermore, this tire is provided with toroidal carcass 4 which is arranged so as to span the distance between the pair of bead 1 and which extends from tread 3 and passes through sidewall 2 to reach bead 1. Carcass 4 has end regions that are routed by way of bead cores to be retained in upturned fashion. Arranged toward the inside circumferential surface of carcass 4 is inner liner rubber 5 for retention of air pressure.

Provided in order from the interior to the exterior at the outside circumference of carcass 4 at tread 3 are a plurality (four in the present embodiment) of belt plies 6a, 6b, 6c, 6d for reinforcing carcass 4; and tread rubber 30. Formed at the surface of tread 3 are a plurality of major grooves 31 extending in the tire circumferential direction CD, and rib(s) which are partitioned by major grooves 31 and which extend in continuous fashion in the tire circumferential direction CD. As the present embodiment is a rib tire, blocks, i.e., regions produced by division in the tire circumferential direction CD, are not formed thereon. Whereas, in the present embodiment, two major grooves 31 are formed at each side of the tire such that there are a total of four major grooves 31 overall, there is no limitation with respect thereto. For example, there may be a total of three thereof overall, or there may be a total of five or more thereof overall.

The four belt plies 6a, 6b, 6c, 6d comprise a plurality of steel cords which are respectively arrayed in parallel after the fashion of a Venetian blind, these being formed in such fashion as to be covered by rubber. The cords of belt plies 6b, 6c, which are the second and third among the four belt plies 6a, 6b, 6c, 6d as these are numbered in order from carcass 4 to the outside circumference, intersect, being inclined in mutually opposite fashion with respect to the axis of the tire. Second and third belt plies 6b, 6c are so-called main belts which entrap tread rubber 30 therebetween.

As shown in FIG. 1, tread 3 forms contact patch 33. Present toward the exterior WD1 in the tire width direction of tread 3 is tire sidewall 7 formed from sidewall rubber. That portion of tire sidewall 7 which is in the region from edge LE (contact patch edge LE) of tread 3 to tire maximum width location Wh is buttress 70. Contact patch edge LE is the edge toward the exterior WD1 in the tire width direction of contact patch 33, which corresponds to the ridge line (peak-like shape) between tread 3 and tire sidewall 7 in a tire intended for heavy loads.

Figure 3:
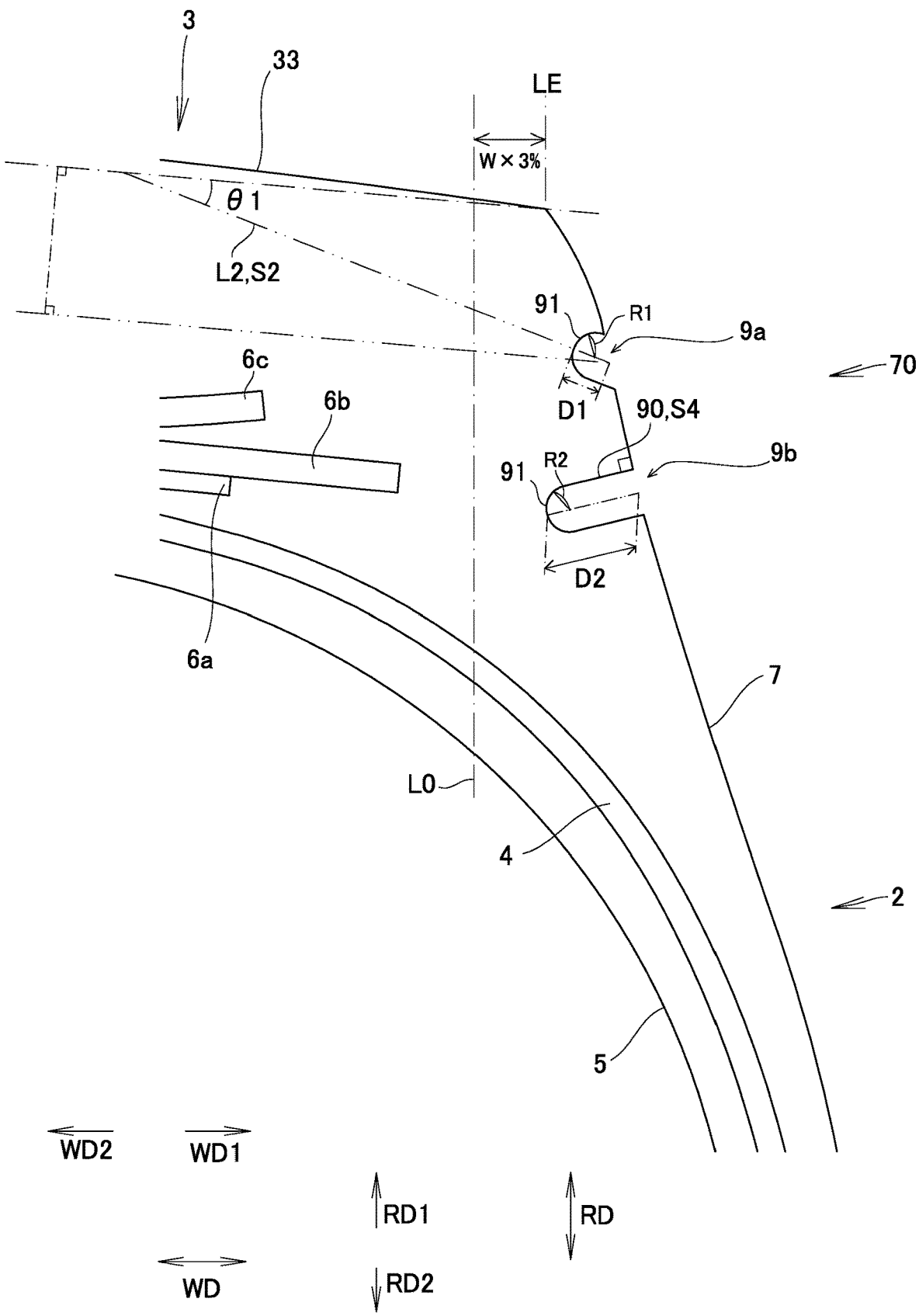
FIG. 3 Tire meridional section showing principal components in an example of a pneumatic tire in accordance with a first embodiment.

FIG. 3 is an enlarged view of the principal components at FIG. 1. As shown in FIG. 1 through FIG. 3, buttress 70 might, for example, be such that at least two annular grooves 9 are formed thereat. The at least two annular grooves 9 extend in the tire circumferential direction CD and are ring-like in shape, and also extend so as to be directed toward the interior WD2 in the tire width direction. As shown in FIG. 1 and FIG. 3, the at least two annular grooves 9 include first annular groove 9a which is nearest to contact patch 33, and second annular groove 9b which is farther from the contact patch than first annular groove 9a. Second annular groove 9b is located toward the interior in the tire radial direction from the first annular groove. As viewed in a tire meridional section, annular groove 9 appears to extend in a straight line, and the groove bottom is formed so as to be arcuate in shape.

Formation of annular groove(s) 9 at buttress 70 makes it possible to reduce contact patch pressure at the shoulder edge (lug 32 at the periphery of contact patch edge LE), and to reduce uneven wear. Furthermore, while large lateral forces are generated during cornering or when going over ruts, because at least two annular grooves are formed thereat, it is possible to cause stresses acting on groove bottoms to be dispersed, and it is possible to suppress occurrence of cracking.

It so happens that annular grooves 9 formed at buttress 70 deform during driving, and where deformation of annular grooves 9 is large, there is a possibility that there will be occurrence of a large amount of wandering (meandering) when going over a rut, which may result in decreased performance with respect to stability in handling.

Rigidity is not easily achieved, and deformation during driving tends to be large, at first annular groove 9a which, being nearest to contact patch 33, is farther from the belt plies (6a through 6d) than second annular groove 9b. To address this problem, it is therefore preferred as shown in the embodiment at FIG. 3 that depth D1 of first annular groove 9a be less than depth D2 of second annular groove 9b. Because depth D1 of first annular groove 9a is thus less than depth D2 of second annular groove 9b, it is possible to suppress deformation of first annular groove 9a, and it is possible to suppress wandering that might otherwise occur when going over a rut and to cause improvement in performance with respect to stability in handling. Of course, where it is not intended that this problem be solved, the depths of first annular groove 9a and second annular groove 9b may be the same, or the depth of first annular groove 9a may be greater than the depth of second annular groove 9b.

Figure 4:
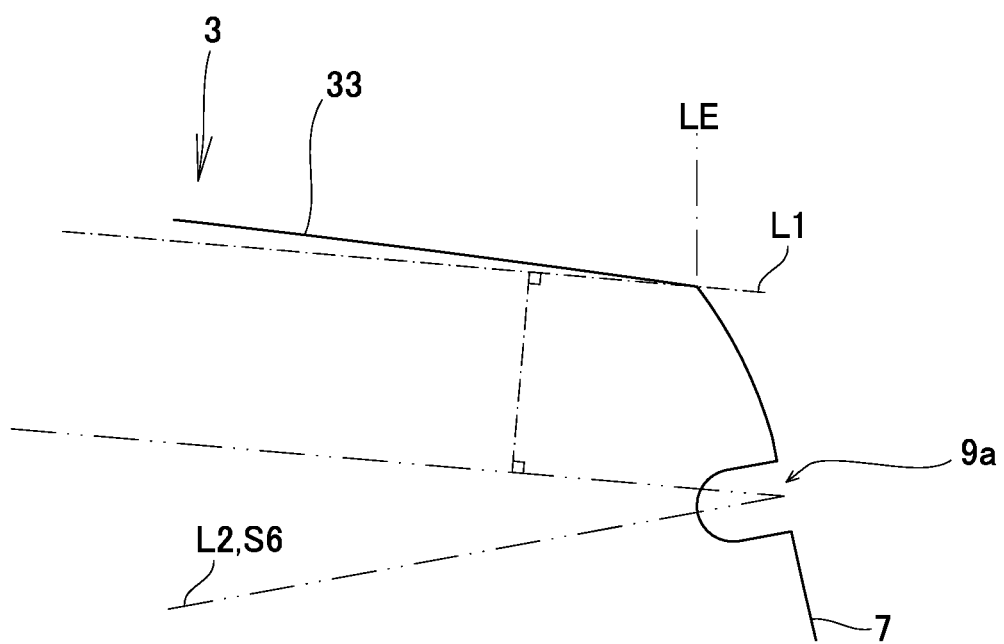
FIG. 4 Tire meridional section showing a variation.
Figure 4:
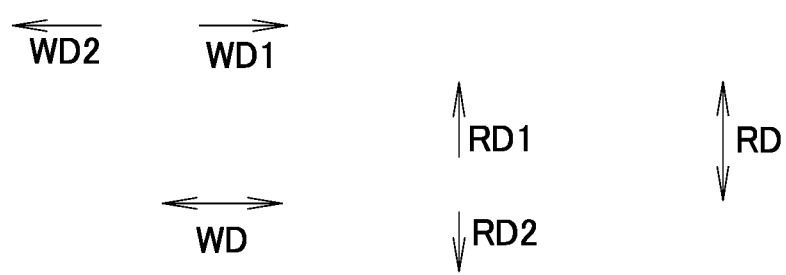
Figure 5:
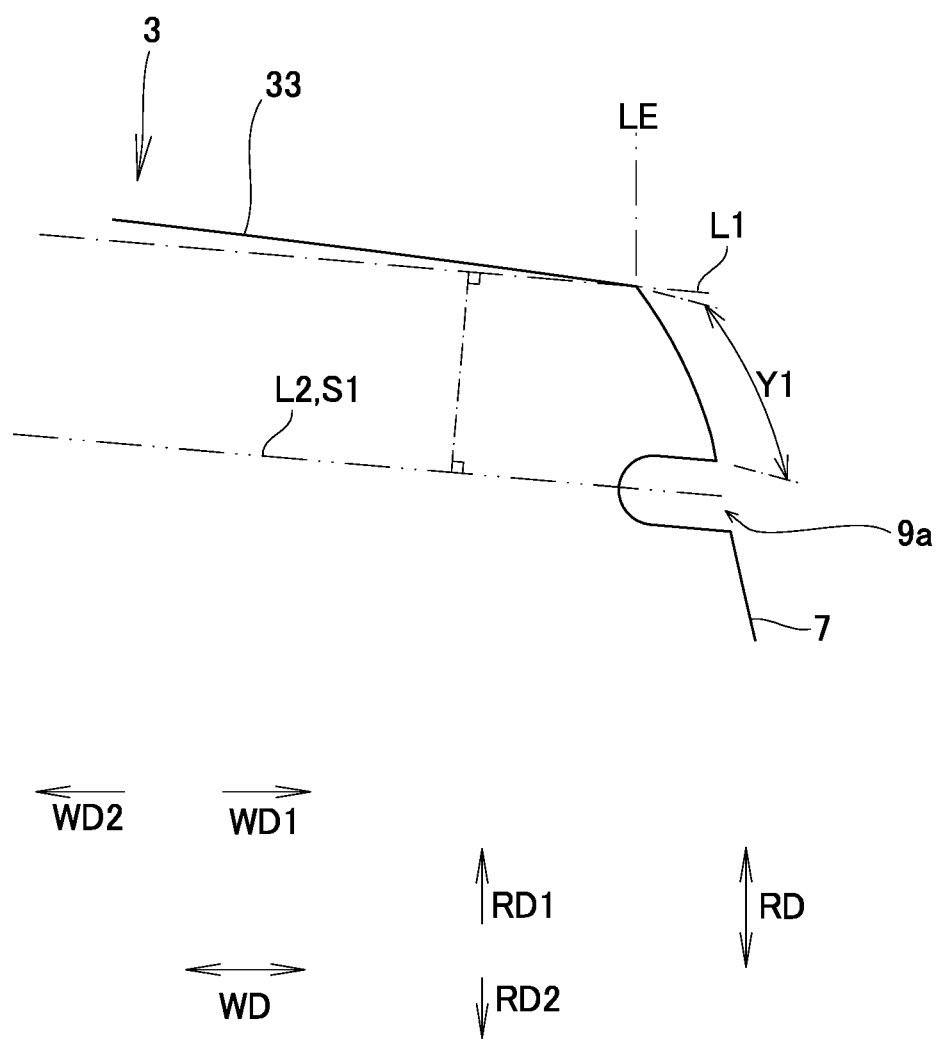
FIG. 5 Tire meridional section showing a variation.

As shown in FIG. 3, it is sufficient that the maximum depths of first annular groove 9a and second annular groove 9b not extend beyond a vertical line L0 drawn so as to pass through a location toward the interior WD2 in the tire width direction and separated from contact patch edge LE by an amount corresponding to 3% of tread width W. Vertical line L0 is parallel to the tire radial direction RD. This is because wandering will increase, and performance with respect to stability in handling will be lowered, if first annular groove 9a and second annular groove 9b are too deep.

Where annular grooves 9 formed at buttress 70 appear to be straight lines extending toward the interior WD2 in the tire width direction as viewed in a tire meridional section, depending on the directions in which annular grooves 9 extend there is a possibility when a pebble is caught in an annular groove 9 (i.e., when a pebble becomes lodged therein) that cracking may occur and that there may be occurrence of stone drilling in which damage is inflicted upon belt plies 6a, 6b, 6c, 6d or other such internal members. It is therefore preferred to provide a pneumatic tire in which there is reduced occurrence of stone drilling and/or other such problems. In particular, as shown in FIG. 4, it was found that when first annular groove 9a is oriented in sixth direction S6, this causes first annular groove 9a to become close to belt plies 6b, 6c, which leads to an increase in the tendency for stone drilling to occur. Sixth direction S6 shown in FIG. 4 is a direction that causes the groove bottom to be more toward the interior RD2 in the tire radial direction than is the case with first direction S1 shown in FIG. 5. As shown in FIG. 1 and FIG. 5, as viewed in a tire meridional section, first direction S1 is such that groove central axis L2 appears to be parallel to an imaginary line L1 drawn so as to connect the ridge line LE between contact patch 33 and tire sidewall 7 with the intersection P1 of tire equator CL and contact patch 33.

Furthermore, to suppress occurrence of stone drilling, it is preferred that first annular groove 9a appear to extend in a straight line as viewed in a tire meridional section, and that first annular groove 9a be oriented in first direction S1 (see FIG. 5) or second direction S2 (see FIG. 3). This is so as to avoid a situation in which the groove bottom comes too close to the belt plies, so that occurrence of stone drilling can be suppressed. Of course, where it is not intended that this problem be solved, first annular groove 9a may be oriented in any direction. As shown in FIG. 3, as viewed in a tire meridional section, second direction S2 is a direction that causes the groove bottom to be more toward the exterior RD1 in the tire radial direction than would be the case were it oriented in the first direction S1.

On the other hand, if first annular groove 9a is oriented in second direction S2 and the groove bottom is too close to contact patch 33, there is a possibility that there will be occurrence of tearing in which portion(s) of the buttress 70 toward the exterior RD1 in the tire radial direction from first annular groove 9a are torn off therefrom and that the effect whereby first annular groove 9a reduces contact patch pressure will be impaired. To avoid occurrence of tearing, first annular groove 9a is separated by not less than 8 mm from contact patch edge LE along tire sidewall 7 as indicated by arrow Y1 in FIG. 5 and is most preferably oriented in first direction S1, or where it is oriented in second direction S2 it is preferred from the standpoint of suppressing occurrence of tearing that angle θ1 made by imaginary line L1 and groove central axis L2 be not greater than 20 degrees. To suppress occurrence of both tearing and stone drilling, it is preferred that first annular groove 9a be oriented in first direction S1.

Figure 6:
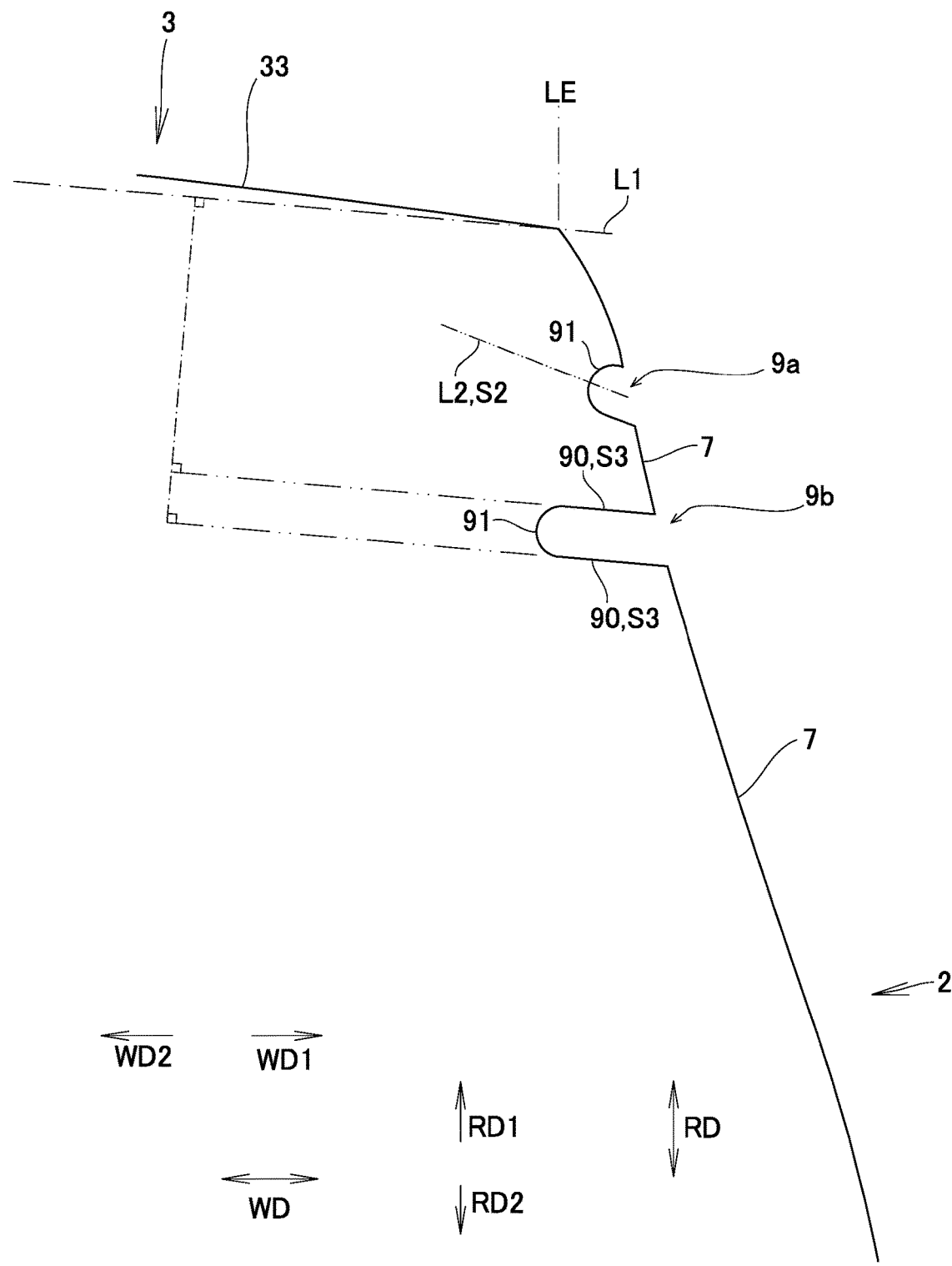
FIG. 6 Tire meridional section showing a variation.
Figure 7:
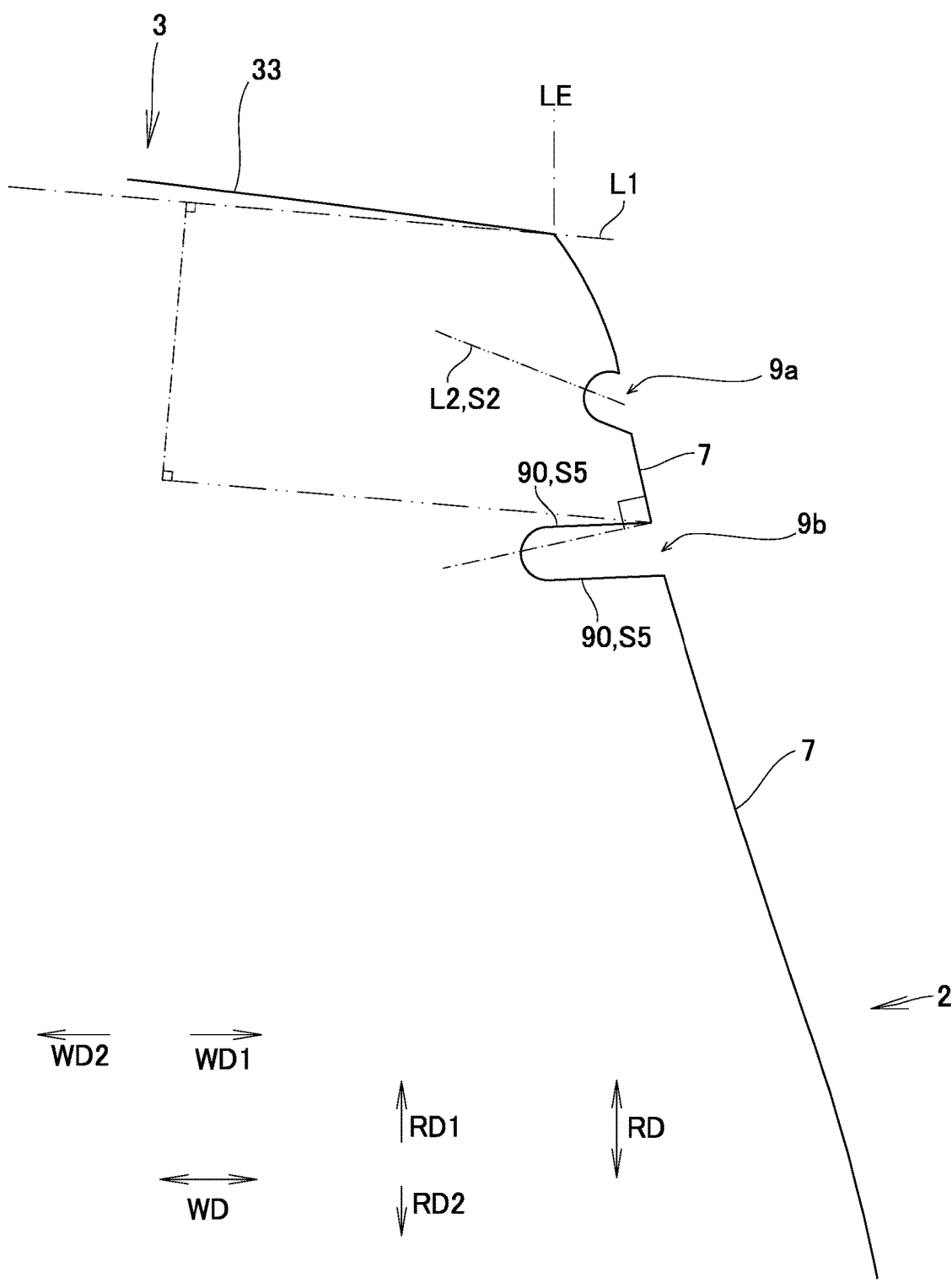
FIG. 7 Tire meridional section showing a variation.
Figure 8:
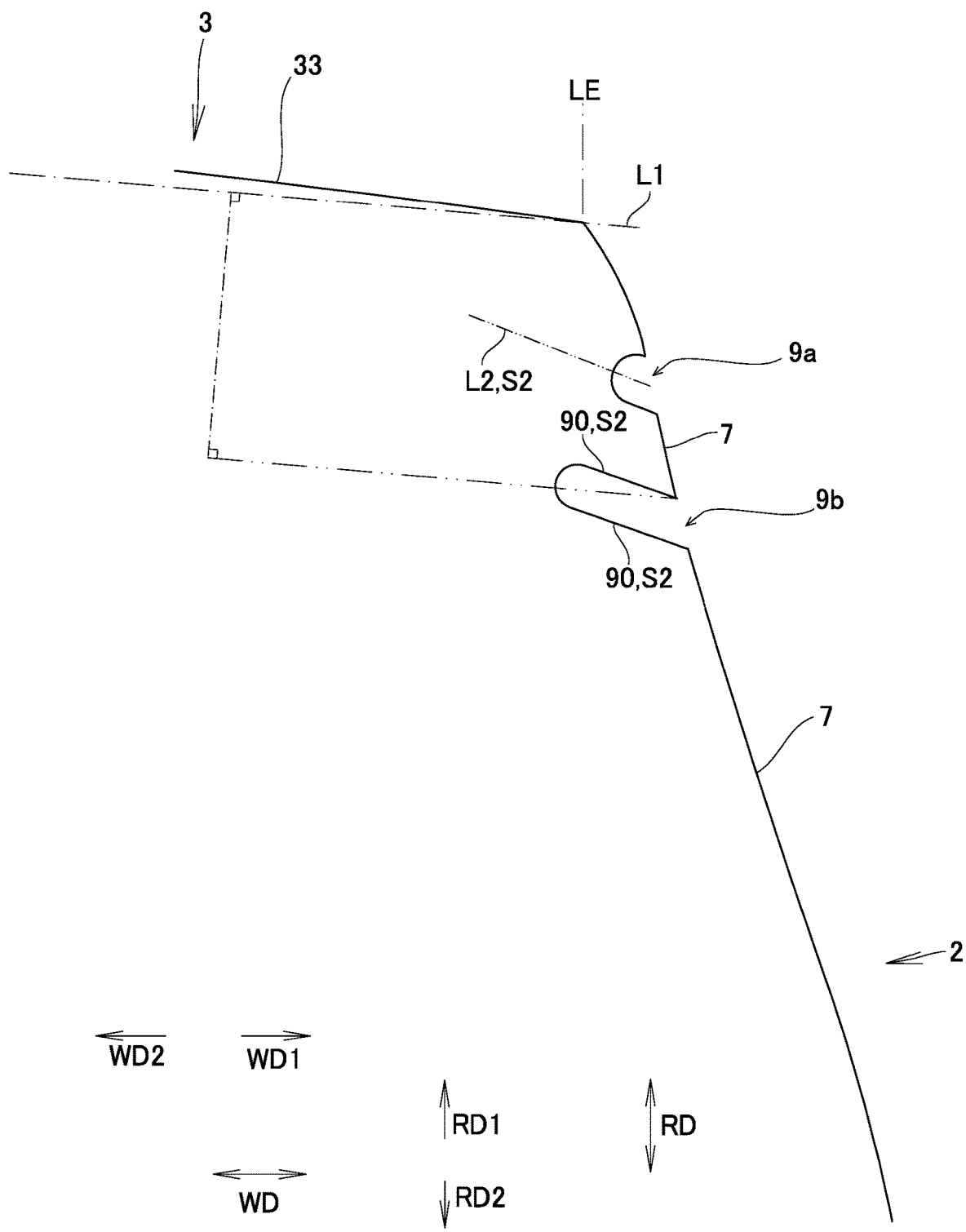
FIG. 8 Tire meridional section showing a variation.

As shown in FIG. 3, FIG. 6, and FIG. 7, to reduce the tendency for there to be torn off of material at the corner between tire sidewall 7 and groove wall 90 of second annular groove 9b, it is preferred that second annular groove 9b appear to extend in a straight line as viewed in a tire meridional section, and that second annular groove 9b be oriented in third direction S3 (see FIG. 6), fourth direction S4 (see FIG. 3), or fifth direction S5 (see FIG. 7). As shown in FIG. 3, FIG. 6, and FIG. 7, if second annular groove 9b is oriented in third direction S3, fourth direction S4, or fifth direction S5, it will be possible to prevent or suppress occurrence of torn off of material at the corner between tire sidewall 7 and groove wall 90 of second annular groove 9b. Of course, where it is not intended that this problem be solved, second annular groove 9b may be oriented in any direction shown in FIG. 3, FIG. 6, FIG. 7, or FIG. 8. As shown in FIG. 6, as viewed in a tire meridional section, third direction S3 is a direction that causes groove wall 90 to appear to be parallel to imaginary line L1. As shown in FIG. 3, as viewed in a tire meridional section, fourth direction S4 is a direction that causes groove wall 90 of second annular groove 9b to appear to be perpendicular to tire sidewall 7. As shown in FIG. 7, fifth direction S5 is a direction that lies between third direction S3 and fourth direction S4. Second direction S2 shown in FIG. 8 causes second annular groove 9b to be such that the groove bottom is further toward the exterior RD1 in the tire radial direction than would be the case were it oriented in third direction S3.

It so happens that strain is produced at the bottoms of the annular grooves formed at the buttress, and cracking can occur at the groove bottom if the strain is too large. Where at least two annular grooves are provided, because the annular groove that is nearest to the contact patch will have the greatest tendency to undergo deformation, strain tends to be concentrated and cracking tends to occur at the annular groove. It is therefore preferred to provide a pneumatic tire in which there is reduced occurrence of annular groove cracking and/or other such problems.

Figure 9:
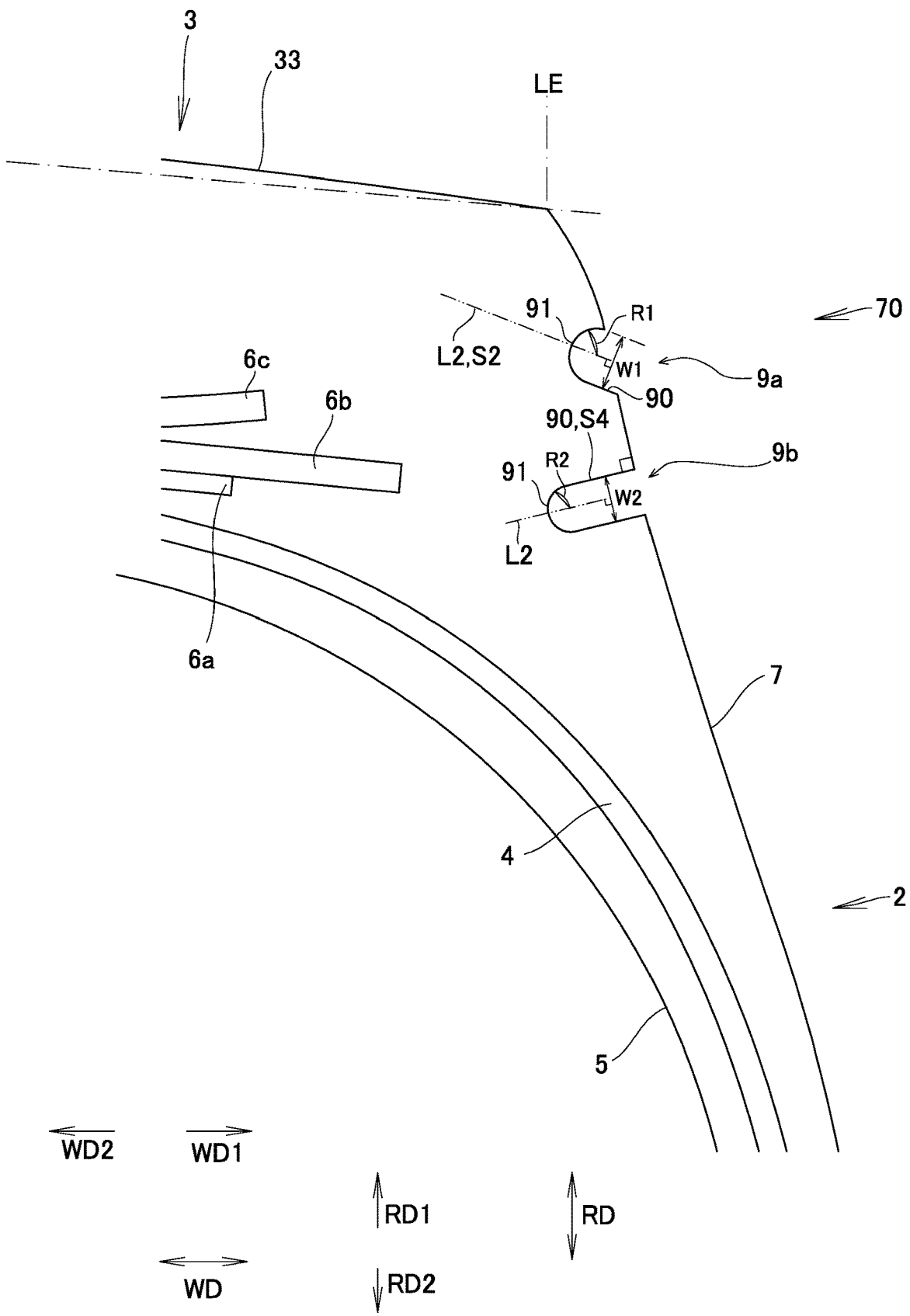
FIG. 9 Tire meridional section showing a variation.

As shown in FIG. 9, to suppress occurrence of cracking at first annular groove 9a, it is therefore preferred that the bottoms 91 of first annular groove 9a and second annular groove 9b be formed so as to be arcuate in shape, and that the radius of curvature R1 of the bottom 91 of first annular groove 9a be greater than the radius of curvature R2 of the bottom 91 of second annular groove 9b. Note in the present embodiment that the center of the radius of curvature is the center of the groove width. Of course, where it is not intended that this problem be solved, the two radii of curvature R1, R2 may be the same, as is shown in FIG. 3. Furthermore, the radius of curvature R1 at first annular groove 9a may be smaller than the radius of curvature R2 at second annular groove 9b. Furthermore, the bottoms 91 of first annular groove 9a and second annular groove 9b need not be formed so as to be arcuate in shape.

If the bottoms of annular grooves 9 are squarish in shape, cracking will occur, as it will be initiated from the corners. Furthermore, the nearer that annular groove 9 is to the contact patch the greater will be its deformation. Because bottoms 91 of first annular groove 9a and second annular groove 9b are formed so as to appear arcuate in shape as viewed in a tire meridional section, it is possible to eliminate corners and suppress occurrence of cracking. At the same time, because radius of curvature R1 of the bottom 91 of first annular groove 9a, which is nearest to the contact patch, is greater than radius of curvature R2 of the bottom 91 of second annular groove 9b, it is possible to distribute strain acting at the bottom 91 of first annular groove 9a and to suppress occurrence of cracking.

Figure 10:
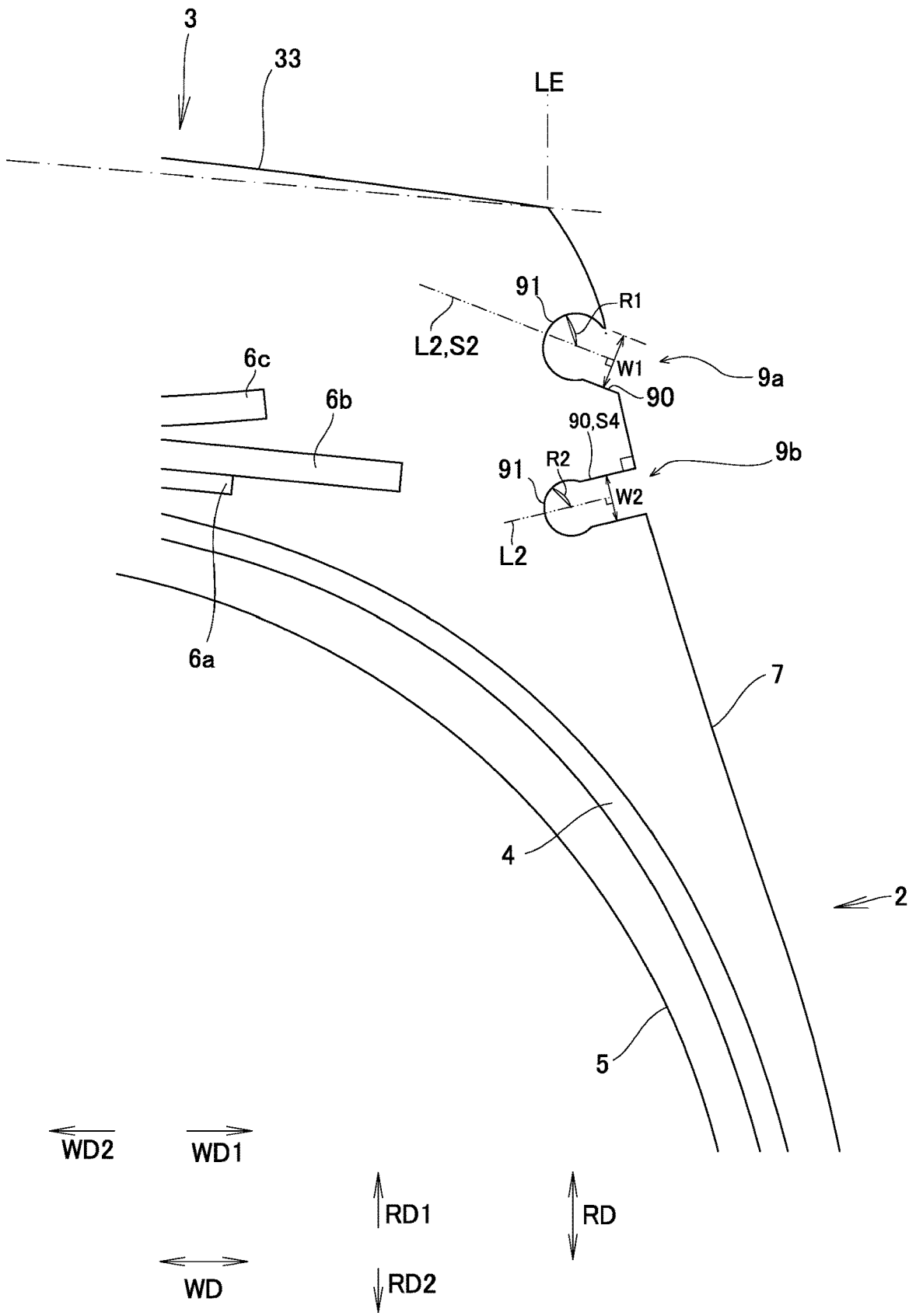
FIG. 10 Tire meridional section showing a variation.

Moreover, whereas in the present embodiment the groove width W1, W2 at the linear location and the radius of curvature R1, R2 at the arcuate location at the groove bottom 91 are the same as shown in FIG. 9, the radius of curvature R1, R2 at the arcuate location at the groove bottom 91 may be made greater than the groove width W1, W2 at the linear location to produce a flask-like shape as shown in FIG. 10.

To suppress occurrence of situations in which pebbles become lodged in first annular groove 9a, it is preferred that width W1 of first annular groove 9a be greater than width W2 of second annular groove 9b. The smaller the widths W1, W2 of annular grooves 9 the greater will be the tendency for pebbles to become lodged therein. Where the widths W1, W2 of annular grooves 9 are the same, the nearer that an annular groove is to contact patch 33 the greater will be the tendency for pebbles to become lodged therein. By causing width W1 of first annular groove 9a, at which there would otherwise be a greater tendency for pebbles to become lodged therein, to be greater than width W2 of second annular groove 9b, it is therefore possible to reduce occurrence of situations in which pebbles become lodged in first annular groove 9a. Of course, where it is not intended that this problem be solved, width W1 of first annular groove 9a and width W2 of second annular groove 9b may be the same, or width W1 of first annular groove 9a may be less than width W2 of second annular groove 9b. Furthermore, the bottoms 91 of first annular groove 9a and second annular groove 9b need not be formed so as to be arcuate in shape. As shown in FIG. 9 and FIG. 10, groove widths W1, W2 are measured in a direction perpendicular to groove central axis L2.

For example, the nearer to contact patch 33 the greater will be the deformation due to annular groove 9 during driving, and where deformation is large, there is a possibility that there will be a large amount of wandering when going over ruts, which may cause deterioration in performance with respect to stability in handling. Where there is a greater desire to achieve improved performance with respect to stability in handling than there is to suppress occurrence of situations in which pebbles become lodged therein, it is therefore preferred that width W1 of first annular groove 9a be less than width W2 of second annular groove 9b.

It is preferred that widths W1, W2 of first annular groove 9a and second annular groove 9b be not less than 2 mm but not greater than 5 mm. If widths W1, W2 of annular grooves 9 are less than 2 mm, this will make it difficult to produce the effect whereby contact patch pressure at the shoulder edge is reduced. Furthermore, if widths W1, W2 of annular grooves 9 are greater than 5 mm, this will cause reduction in the rigidity of the shoulder, increasing deformation of the tire and lowering performance with respect to stability in handling. Where widths W1, W2 of annular grooves 9 are not less than 2 mm but not greater than 5 mm, this will make it possible to appropriately achieve the effect whereby contact patch pressure at the shoulder edge is reduced while ensuring that there will be adequate performance with respect to stability in handling.

If annular groove 9 is arranged at or in the vicinity of tire maximum width location Wh, because this will increase deformation of the tire, it can lead to increase in occurrence of cracking of annular groove(s) 9. As shown in FIG. 1, as viewed in a tire meridional section, it is therefore preferred that first annular groove 9a and second annular groove 9b be arranged toward the exterior RD1 in the tire radial direction from the radial midpoint φ3 between the radius φ1 at the tire outside diameter and the radius φ2 at the tire maximum width location Wh. This is so as to make it possible to suppress occurrence of cracking. The foregoing radii are determined while under no load when the tire is mounted on an appropriate rim and appropriately inflated to prescribed internal pressure. An appropriate rim is that particular rim which is specified for use with a particular tire in the context of the body of standards that contains the standard that applies to the tire in question; e.g., a rim specified for use therewith by JATMA, TRA, ETRTO, or the like. Furthermore, prescribed internal pressure is that air pressure which is specified for use with a particular tire by a particular standard in the context of the foregoing body of standards.

So that the effect of annular grooves 9 might be maintained from the initial stage of wear to the final stage of wear of the tire, it is preferred that at least two annular grooves 9 be toward the interior RD2 in the tire radial direction from the apex of the TWI (tread wear indicator) formed at major groove(s) 31.

As described above, as is the case in the present embodiment, it is also possible that a pneumatic tire having a tread 3 that forms a contact patch 33; a buttress 70 which is that portion of a tire sidewall 7 located toward an exterior (WD1) in a tire width direction from the tread 3 that is a region from an edge of the tread 3 to a tire maximum width location (Wh); and at least two annular grooves 9 which are formed at the buttress 70, which extend in a tire circumferential direction CD, which are ring-like in shape, and which also extend so as to be directed toward an interior (WD2) in the tire width direction; wherein the at least two annular grooves 9 include a first annular groove 9*a* which is nearest to the contact patch 33, and a second annular groove 9*b* which is farther away from the contact patch 33 than the first annular groove 9*a*; depth D1 of the first annular groove 9*a* is less than depth D2 of the second annular groove 9*b*.

Rigidity is not easily achieved, and deformation during driving tends to be large, at first annular groove 9*a* which, being nearest to contact patch 33, is farther from belt plies 6*b*, 6*c* than second annular groove 9*b*. Because depth D1 of first annular groove 9*a* is thus less than depth D2 of second annular groove 9*b*, it is possible to suppress deformation of first annular groove 9*a*, and it is possible to suppress wandering that might otherwise occur when going over a rut and to cause improvement in performance with respect to stability in handling. Furthermore, while large lateral forces are generated during cornering or when going over ruts, because at least two annular grooves 9 are formed thereat, it is possible to cause stresses acting on groove bottoms 91 to be dispersed, and it is possible to suppress occurrence of cracking.

As is the case in the present embodiment, it is also possible that a pneumatic tire having a tread 3 that forms a contact patch 33; a buttress 70 which is that portion of a tire sidewall 7 located toward an exterior (WD1) in a tire width direction from the tread 3 that is a region from an edge of the tread 3 to a tire maximum width location (Wh); and at least two annular grooves 9 which are formed at the buttress 70, which extend in a tire circumferential direction CD, which are ring-like in shape, and which also extend so as to be directed toward an interior (WD2) in the tire width direction; wherein the at least two annular grooves 9 include a first annular groove 9*a* which is nearest to the contact patch 33, and a second annular groove 9*b* which is farther away from the contact patch 33 than the first annular groove 9*a*; the first annular groove 9*a* appears to extend in a straight line as viewed in a tire meridional section; the first annular groove 9*a* is oriented in a first direction S1 or a second direction S2; the first direction S1 is such as will cause, as viewed in a tire meridional section, a groove central axis L2 to be parallel to an imaginary line L1 drawn so as to connect a ridge line LE between the contact patch 33 and the tire sidewall 7 with an intersection P1 of a tire equator CL and the contact patch 33; and the second direction S2 is such as will cause, as viewed in a tire meridional section, the groove bottom 91 to be more toward an exterior (RD1) in a tire radial direction than would be the case were it oriented in the first direction S1.

Because first annular groove 9*a* is closer to belt plies 6*b*, 6*c* when it is oriented in sixth direction S6 which causes groove bottom 91 to be further toward the interior RD2 in the tire radial direction than is the case when first annular groove 9*a* is oriented in first direction S1, there is a possibility when a pebble becomes lodged therein that cracking may occur and that there may be occurrence of stone drilling in which damage is inflicted upon belt plies 6*b*, 6*c*. By causing first annular groove 9*a* to be oriented in first direction S1 or second direction S2, it is possible to suppress occurrence of stone drilling.

As is the case in the present embodiment, it is also possible that the first annular groove 9*a* is oriented in the first direction S1.

If first annular groove 9*a* is oriented in second direction S2 and groove bottom 91 is too close to contact patch 33, there is a possibility that there will be occurrence of tearing in which portion(s) of the buttress 70 that are toward the exterior RD1 in the tire radial direction from annular groove(s) 9 are torn off therefrom. If first annular groove 9*a* is oriented in first direction S1, it will be possible suppress occurrence of both tearing and stone drilling.

As is the case in the present embodiment, it is also possible that the second annular groove 9*b* appears to extend in a straight line as viewed in a tire meridional section; the second annular groove 9*b* is oriented in a third direction S3, fourth direction S4, or fifth direction S5; the third direction S3 is such as will cause, as viewed in a tire meridional section, a groove wall 90 to be parallel to an imaginary line L1 drawn so as to connect a ridge line LE between the contact patch 33 and the tire sidewall 7 with an intersection P1 of a tire equator CL and the contact patch 33; the fourth direction S4 is such as will cause, as viewed in a tire meridional section, a groove wall 90 of the second annular groove 9*b* to be perpendicular to the tire sidewall 7; and the fifth direction S5 lies between the third direction S3 and the fourth direction S4.

If second annular groove 9*b* is oriented in fourth direction S4, this will cause the corner between tire sidewall 7 and groove wall 90 of second annular groove 9*b* to be perpendicular, which will reduce the tendency for there to be torn off of material thereat. If second annular groove 9*b* is oriented in second direction S2 which causes the groove bottom to be further toward the exterior RD1 in the tire radial direction than would be the case were it oriented in third direction S3, this will cause the corner between tire sidewall 7 and groove wall 90 of second annular groove 9*b* to become too acute, which will increase the tendency for torn off of material to occur thereat. Therefore, if second annular groove 9*b* is oriented in third direction S3, fourth direction S4, or fifth direction S5, it will be possible to prevent or suppress occurrence of torn off of material at the corner between tire sidewall 7 and groove wall 90 of second annular groove 9*b*.

As is the case in the present embodiment, it is also possible that the second annular groove 9*b* is oriented in the fourth direction S4.

As a result of adoption of this constitution, it will be possible to prevent occurrence of torn off of material at the corner between tire sidewall 7 and groove wall 90 of second annular groove 9*b*.

As is the case in the present embodiment, it is also possible that a pneumatic tire having a tread 3 that forms a contact patch 33; a buttress 70 which is that portion of a tire sidewall 7 located toward an exterior (WD1) in a tire width direction from the tread 3 that is a region from an edge of the tread 3 to a tire maximum width location (Wh); and at least two annular grooves 9 which are formed at the buttress 70, which extend in a tire circumferential direction CD, which are ring-like in shape, and which also extend so as to be directed toward an interior (WD2) in the tire width direction; wherein the at least two annular grooves 9 include a first annular groove 9*a* which is nearest to the contact patch 33, and a second annular groove 9b which is farther away from the contact patch 33 than the first annular groove 9a; bottoms 91 of the first annular groove 9a and the second annular groove 9b are formed so as to appear arcuate in shape as viewed in a tire meridional section; and radius of curvature R1 of the bottom 91 of the first annular groove 9a is greater than radius of curvature R2 of the bottom 91 of the second annular groove 9b.

If the bottoms 91 of annular grooves 9 are squarish in shape, cracking will occur, as it will be initiated from the corners. Furthermore, the nearer that annular groove 9 is to contact patch 33 the greater will be its deformation.

By therefore causing bottoms 91 of first annular groove 9a and second annular groove 9b to be formed so as to appear arcuate in shape as viewed in a tire meridional section as in the present embodiment, it will be possible to eliminate corners and suppress occurrence of cracking. At the same time, because radius of curvature R1 of the bottom 91 of first annular groove 9a, which is nearest to contact patch 33, is greater than radius of curvature R2 of the bottom 91 of second annular groove 9b, it is possible to distribute strain acting at the bottom 91 of first annular groove 9a and to suppress occurrence of cracking.

As is the case in the present embodiment, it is also possible that width W1 of the first annular groove 9a is greater than width W2 of the second annular groove 9b.

The smaller the widths W1, W2 of annular grooves 9 the greater will be the tendency for pebbles to become lodged therein. Where the widths of annular grooves 9 are the same, the nearer that an annular groove is to contact patch 33 the greater will be the tendency for pebbles to become lodged therein. By causing width W1 of first annular groove 9a, at which there would otherwise be a greater tendency for pebbles to become lodged therein, to be greater than width W2 of second annular groove 9b as in the present embodiment, it will be possible to reduce occurrence of situations in which pebbles become lodged in first annular groove 9a.

It is also possible that width W1 of first annular groove 9a be less than width W2 of second annular groove 9b.

For example, the nearer that annular groove 9 is to contact patch 33 the greater will be the deformation due to annular groove 9 during driving, and where deformation is large, there is a possibility that there will be a large amount of wandering when going over ruts, which may cause deterioration in performance with respect to stability in handling. By therefore causing width W1 of first annular groove 9a be less than width W2 of second annular groove 9b, it will be possible to improve performance with respect to stability in handling.

It is preferred as in the present embodiment that widths W1, W2 of first annular groove 9a and second annular groove 9b each be not less than 2 mm but not greater than 5 mm.

If widths W1, W2 of annular grooves 9 are less than 2 mm, this will make it difficult to produce the effect whereby contact patch pressure at the shoulder edge is reduced. Furthermore, if widths W1, W2 of annular grooves 9 are greater than 5 mm, this will cause reduction in the rigidity of the shoulder, increasing deformation of the tire and lowering performance with respect to stability in handling. Where, as in the present embodiment, widths W1, W2 of annular grooves 9 are not less than 2 mm but not greater than 5 mm, this will make it possible to appropriately achieve the effect whereby contact patch pressure at the shoulder edge is reduced while ensuring that there will be adequate performance with respect to stability in handling.

As is the case in the present embodiment, it is also possible that as viewed in a tire meridional section, the first annular groove 9a and the second annular groove 9b are arranged toward an exterior RD1 in a tire radial direction from a radial midpoint φ3 between a radius φ1 at a tire outside diameter and a radius φ2 at the tire maximum width location.

If annular groove 9 is arranged at or in the vicinity of tire maximum width location Wh, because this will increase deformation of the tire, it can lead to increase in occurrence of cracking of annular groove(s) 9. By causing annular grooves 9 to be arranged at the foregoing locations as in the present embodiment, it will be possible to suppress occurrence of cracking at annular grooves 9.

While embodiments in accordance with the present disclosure have been described above with reference to the drawings, it should be understood that the specific constitution thereof is not limited to these embodiments. The scope of the present disclosure is as indicated by the claims and not merely as described at the foregoing embodiments, and moreover includes all variations within the scope of or equivalent in meaning to that which is recited in the claims.

Structure employed at any of the foregoing embodiment(s) may be employed as desired at any other embodiment(s). The specific constitution of the various components is not limited only to the foregoing embodiment(s) but admits of any number of variations without departing from the gist of the present disclosure.

The invention claimed is:

1. A pneumatic tire comprising:
   a tread that forms a contact patch;
   a buttress which is that portion of a tire sidewall located toward an exterior in a tire width direction from the tread that is a region from an edge of the tread to a tire maximum width location; and
   at least two annular grooves which are formed at the buttress, which extend in a tire circumferential direction, which are ring-like in shape, and which also extend so as to be directed toward an interior in the tire width direction;
   wherein the at least two annular grooves include a first annular groove which is nearest to the contact patch, and a second annular groove which is farther away from the contact patch than the first annular groove;
   bottoms of the first annular groove and the second annular groove are formed so as to appear arcuate in shape as viewed in a tire meridional section;
   radius of curvature of the bottom of the first annular groove is greater than radius of curvature of the bottom of the second annular groove,
   wherein depth of the first annular groove is less than depth of the second annular groove, and
   wherein the first annular groove and the second annular groove each extend in a straight line as viewed in a tire meridional section in different orientations.

2. The tire according to claim 1 wherein width of the first annular groove is greater than width of the second annular groove.

3. The tire according to claim 1 wherein width of the first annular groove is less than width of the second annular groove.

4. The tire according to claim 1 wherein the widths of the first annular groove and the second annular groove are each not less than 2 mm but not greater than 5 mm.

5. The tire according to claim 1 wherein, as viewed in the tire meridional section, the first annular groove and the second annular groove are arranged toward an exterior in a tire radial direction from a radial midpoint between a radius at a tire outside diameter and a radius at the tire maximum width location.

6. The tire according to claim 1 wherein
the first annular groove extends in the straight line as viewed in the tire meridional section;
the first annular groove is oriented in a first direction or a second direction;
the first direction is such as will cause, as viewed in a tire meridional section, a groove central axis to be parallel to an imaginary line drawn so as to connect a ridge line between the contact patch and the tire sidewall with an intersection of a tire equator and the contact patch; and
the second direction is such as will cause, as viewed in a tire meridional section, the groove bottom to be more toward an exterior in a tire radial direction than would be the case were it oriented in the first direction.

7. The tire according to claim 6 wherein the first annular groove is oriented in the first direction.

8. The tire according to claim 6 wherein
the second annular groove extends in the straight line as viewed in the tire meridional section;
the second annular groove is oriented in a third direction, fourth direction, or fifth direction;
the third direction is such as will cause, as viewed in a tire meridional section, a groove wall to be parallel to an imaginary line drawn so as to connect a ridge line between the contact patch and the tire sidewall with an intersection of a tire equator and the contact patch;
the fourth direction is such as will cause, as viewed in a tire meridional section, a groove wall of the second annular groove to be perpendicular to the tire sidewall; and
the fifth direction lies between the third direction and the fourth direction.

9. The tire according to claim 1 wherein
the second annular groove extends in the straight line as viewed in the tire meridional section;
the second annular groove is oriented in a third direction, fourth direction, or fifth direction;
the third direction is such as will cause, as viewed in a tire meridional section, a groove wall to be parallel to an imaginary line drawn so as to connect a ridge line between the contact patch and the tire sidewall with an intersection of a tire equator and the contact patch;
the fourth direction is such as will cause, as viewed in a tire meridional section, a groove wall of the second annular groove to be perpendicular to the tire sidewall; and
the fifth direction lies between the third direction and the fourth direction.

10. The tire according to claim 9 wherein the second annular groove is oriented in the fourth direction.

* * * * *